(12) United States Patent
Akashi

(10) Patent No.: US 10,603,961 B2
(45) Date of Patent: Mar. 31, 2020

(54) PNEUMATIC TIRE

(71) Applicant: The Yokohama Rubber Co., LTD., Minato-ku, Tokyo (JP)

(72) Inventor: Yasutaka Akashi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 296 days.

(21) Appl. No.: 15/517,503

(22) PCT Filed: Oct. 7, 2015

(86) PCT No.: PCT/JP2015/078511
§ 371 (c)(1),
(2) Date: Apr. 6, 2017

(87) PCT Pub. No.: WO2016/056597
PCT Pub. Date: Apr. 14, 2016

(65) Prior Publication Data
US 2017/0305201 A1    Oct. 26, 2017

(30) Foreign Application Priority Data

Oct. 7, 2014   (JP) .................................. 2014-206752

(51) Int. Cl.
*B60C 11/12*    (2006.01)
*B60C 11/03*    (2006.01)
*B60C 11/11*    (2006.01)

(52) U.S. Cl.
CPC .............. *B60C 11/12* (2013.01); *B60C 11/03* (2013.01); *B60C 11/0306* (2013.01);
(Continued)

(58) Field of Classification Search
CPC . B60C 11/12; B60C 11/1236; B60C 11/1218; B60C 11/1263;
(Continued)

(56) References Cited

U.S. PATENT DOCUMENTS

2002/0170643 A1    11/2002    Kuze
2009/0255616 A1    10/2009    Tomatsu
(Continued)

FOREIGN PATENT DOCUMENTS

JP          9-142110      *  6/1997    ............. B60C 11/12
JP          2003-341306      12/2003
(Continued)

OTHER PUBLICATIONS

JP 2007-216871, English language machine translation [epo.org] (Year: 2007).*

(Continued)

*Primary Examiner* — Eric Hug
(74) *Attorney, Agent, or Firm* — Thorpe North & Western

(57) ABSTRACT

A pneumatic tire comprises a plurality of blocks arranged on a tire ground contact edge. The plurality of blocks each comprise at least one main sipe that comprises: a two-dimensional sipe portion extending in a tire circumferential direction, and a three-dimensional sipe portion extending in a tire lateral direction that connects to the two-dimensional sipe portion.

15 Claims, 9 Drawing Sheets

(52) U.S. Cl.
CPC .......... *B60C 11/11* (2013.01); *B60C 11/1218* (2013.01); *B60C 11/1236* (2013.01); *B60C 11/1263* (2013.01); *B60C 2011/1213* (2013.01)

(58) Field of Classification Search
CPC ......... B60C 2011/1213; B60C 11/0306; B60C 11/11; B60C 11/03; B60C 11/1204; B60C 2011/1209; B60C 2011/1227; B60C 2011/1254
USPC .................................... 152/209.16, 209.18
See application file for complete search history.

(56) References Cited

U.S. PATENT DOCUMENTS

| | | | |
|---|---|---|---|
| 2010/0224297 A1 | 9/2010 | Kiwaki et al. | |
| 2013/0118662 A1 | 5/2013 | Kameda | |
| 2013/0133799 A1 | 5/2013 | Furusawa et al. | |
| 2015/0151586 A1 | 6/2015 | Furusawa | |
| 2016/0243899 A1* | 8/2016 | Miyoshi | B60C 11/0302 |

FOREIGN PATENT DOCUMENTS

| | | | | |
|---|---|---|---|---|
| JP | 2006-056502 | | 3/2006 | |
| JP | 2006-232218 | | 9/2006 | |
| JP | 3894743 | | 3/2007 | |
| JP | 2007-210569 | | 8/2007 | |
| JP | 2007-216871 | * | 8/2007 | ............ B60C 11/12 |
| JP | 4316452 | | 8/2009 | |
| JP | 2009-255688 | | 11/2009 | |
| JP | 2010-042765 | | 2/2010 | |
| JP | 2010-143377 | | 7/2010 | |
| JP | 2011-025837 | | 2/2011 | |
| JP | 2013-023195 | | 2/2013 | |
| JP | 2013-103579 | | 5/2013 | |
| JP | 2013-103621 | | 5/2013 | |
| JP | 2013-112130 | | 6/2013 | |
| JP | 2013-136366 | | 7/2013 | |
| JP | 2013-189137 | | 9/2013 | |
| JP | 2013-252749 | | 12/2013 | |
| JP | 2014-189037 | | 10/2014 | |
| WO | WO 2007/097309 | | 8/2007 | |
| WO | WO 2013/183685 | | 12/2013 | |

OTHER PUBLICATIONS

JP 9-142110, English language machine translation [epo.org] (Year: 1997).*

International Search Report for International Application No. PCT/JP2015/078511 dated Dec. 8, 2015, 4 pages, Japan.

* cited by examiner

| | CONVENTIONAL EXAMPLE 1 | CONVENTIONAL EXAMPLE 2 | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|---|
| MAIN SIPE IN BLOCK INNER REGION | NO | YES | YES | YES | YES | YES | YES | YES | YES | YES | YES | YES |
| MAIN SIPE SHAPE | - | STRAIGHT | L-SHAPED BEND | L-SHAPED BEND | L-SHAPED BEND | L-SHAPED BEND | L-SHAPED BEND | L-SHAPED BEND | L-SHAPED BEND | L-SHAPED BEND | L-SHAPED BEND | L-SHAPED BEND |
| MAIN SIPE CONFIGURATION | - | ONLY TWO-DIMENSIONAL | TWO-DIMENSIONAL AND THREE-DIMENSIONAL | TWO-DIMENSIONAL AND THREE-DIMENSIONAL | TWO-DIMENSIONAL AND THREE-DIMENSIONAL | TWO-DIMENSIONAL AND THREE-DIMENSIONAL | TWO-DIMENSIONAL AND THREE-DIMENSIONAL | TWO-DIMENSIONAL AND THREE-DIMENSIONAL | TWO-DIMENSIONAL AND THREE-DIMENSIONAL | TWO-DIMENSIONAL AND THREE-DIMENSIONAL | TWO-DIMENSIONAL AND THREE-DIMENSIONAL | TWO-DIMENSIONAL AND THREE-DIMENSIONAL |
| θ (DEGREES) | - | - | 60 | 90 | 90 | 90 | 90 | 90 | 90 | 90 | 90 | 90 |
| L1/L2 | - | - | 0.5 | 0.5 | 0.2 | 0.8 | 0.5 | 0.5 | 0.5 | 0.5 | 0.5 | 0.5 |
| D1/D2 | - | - | 1.0 | 1.0 | 1.0 | 1.0 | 0.6 | 0.29 | 0.1 | 0.29 | 0.29 | 0.29 |
| FIRST LATERAL GROOVE | YES | YES | YES | YES | YES | YES | YES | YES | YES | YES | YES | YES |
| GROOVE DEPTH H1 | 4.0 | 4.0 | 4.0 | 4.0 | 4.0 | 4.0 | 4.0 | 4.0 | 4.0 | 4.0 | 4.0 | 4.0 |
| GROOVE WIDTH W1 | 3.8 | 3.8 | 3.8 | 3.8 | 3.8 | 3.8 | 3.8 | 3.8 | 3.8 | 3.8 | 3.8 | 3.8 |
| SECOND LATERAL GROOVE | NO | NO | NO | NO | NO | NO | NO | NO | NO | YES | YES | YES |
| GROOVE DEPTH H2 | - | - | - | - | - | - | - | - | - | 4.0 | 2.5 | 2.5 |
| GROOVE WIDTH W2 | - | - | - | - | - | - | - | - | - | 3.8 | 2.5 | 2.5 |
| H1/H2 | - | - | - | - | - | - | - | - | - | 1.0 | 1.6 | 1.6 |
| W1/W2 | - | - | - | - | - | - | - | - | - | 1.0 | 1.5 | 1.5 |
| AUXILIARY SIPE IN BLOCK OUTER REGION | NO | NO | NO | NO | NO | NO | NO | NO | NO | NO | NO | YES |
| SNOW PERFORMANCE | 100 | 103 | 105 | 107 | 106 | 106 | 107 | 107 | 107 | 109 | 109 | 110 |
| WEAR RESISTANCE PERFORMANCE | 100 | 90 | 99 | 101 | 100 | 100 | 102 | 103 | 102 | 103 | 105 | 105 |

PNEUMATIC TIRE

TECHNICAL FIELD

The present technology relates to a pneumatic tire and particularly relates to a pneumatic tire with improved snow performance and wear resistance performance.

BACKGROUND ART

To increase traction characteristics and improve snow performance, conventional pneumatic tires have typically employed a block pattern.

The technology disclosed in Japanese Unexamined Patent Application Publication No. 2003-341306A is a known conventional pneumatic tire that is configured in this manner.

Configurations employing such a block pattern have the challenge of increasing wear resistance performance (wear durability performance and uneven wear resistance performance) of the blocks.

SUMMARY

The present technology provides a pneumatic tire with improved snow performance and wear resistance performance.

An embodiment of the present technology is a pneumatic tire comprising a plurality of blocks arranged on a tire ground contact edge; the plurality of blocks each comprising an L-shaped sipe that comprises:

a two-dimensional sipe portion extending in a tire circumferential direction, and a three-dimensional sipe portion extending in a tire lateral direction, the two-dimensional sipe portion and the three-dimensional sipe portion connecting to each other or being disposed proximal to each other to form the L-shape.

The pneumatic tire according to an embodiment of the present technology is advantageous because, by the sipe including the three-dimensional sipe portion that extends in the tire lateral direction, edge components of the blocks are increased, thus improving the snow performance of the tire, and the rigidity of the blocks is ensured, thus improving the wear resistance performance of the tire. Additionally, by providing the sipe with the two-dimensional sipe portion that extends in the tire circumferential direction, the rigidity balance of the block changed by the three-dimensional sipe portion is made uniform, and uneven wear of the block is suppressed. Such a configuration is advantageous because the uneven wear resistance performance of the tire is improved.

BRIEF DESCRIPTION OF DRAWINGS

FIG. 14 is a table showing results of performance testing of pneumatic tires according to embodiments of the present technology.

DETAILED DESCRIPTION

Embodiments of the technology are described in detail below with reference to the drawings. However, the technology is not limited to these embodiments. Moreover, constituents of the embodiment include elements that are replaceable while maintaining consistency with of the technology, and obviously replaceable elements. Furthermore, the modified examples described in the embodiments may be freely combined within the scope of obviousness to a person skilled in the art.

Pneumatic Tire

Figure 1:
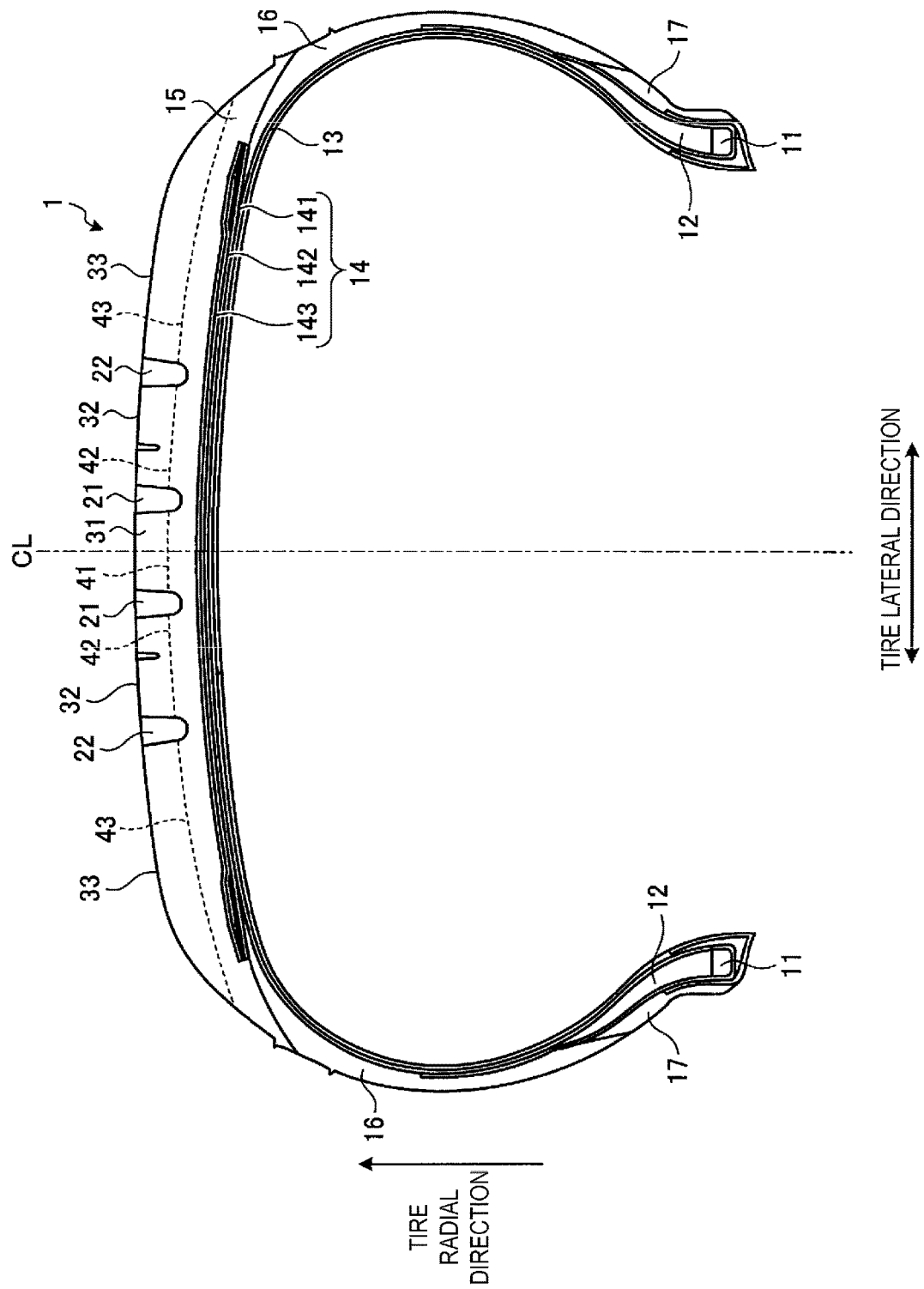
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. FIG. 1 is a cross-sectional view illustrating a region to one side in the tire radial direction. Also, FIG. 1 illustrates a radial tire for a passenger vehicle as an example of a pneumatic tire.

In reference to FIG. 1, "cross section in a tire meridian direction" refers to a cross section of the tire taken along a plane that includes the tire rotation axis (not illustrated). The reference sign "CL" denotes the tire equatorial plane and refers to a plane normal to the tire rotation axis that passes through the center point of the tire in the tire rotation axis direction. "Tire lateral direction", "lateral", and "laterally" refer to a direction parallel to the tire rotation axis. "Tire radial direction", "radial", and "radially" refer to a direction normal to the tire rotation axis.

The pneumatic tire 1 has an annular structure centered on the tire rotational axis and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by a plurality of bead wires bundled together. The pair of bead cores 11, 11 constitute the cores of the left and right bead portions. The pair of bead fillers 12, 12 are disposed outward of the pair of bead cores 11, 11 in the tire radial direction and constitute the bead portions.

The carcass layer 13 has a single-layer structure constituted by one carcass ply or a multi-layer structure constituted by layered carcass plies, and stretches between the left and right bead cores 11, 11 in a toroidal form, forming the framework for the tire. Additionally, both end portions of the carcass layer 13 are turned back outwardly in the tire lateral direction so as to wrap around the bead cores 11 and the bead fillers 12 and fixed. The carcass layer 13 is constituted by a plurality of carcass cords formed from steel or organic fibers (e.g. aramid, nylon, polyester, rayon, or the like) covered by a coating rubber and subjected to a rolling process. The carcass layer 13 has a carcass angle (inclination angle of the fiber direction of the belt cords with respect to the tire circumferential direction), as an absolute value, of from 80 degrees to 95 degrees.

The belt layer 14 is formed by layering a pair of cross belts 141, 142 and a belt cover 143 and is disposed around the periphery of the carcass layer 13. The pair of cross belts 141, 142 are constituted by a plurality of belt cords formed from steel or organic fibers covered by coating rubber and subjected to a rolling process. The cross belts 141, 142 have a belt angle, as an absolute value, of from 20 degrees to 55 degrees. Furthermore, the pair of cross belts 141 and 142 have belt angles (inclination angle of the fiber direction of the belt cords with respect to the tire circumferential direction) of opposite signs, and the belts are layered so that the fiber directions of the belt cords intersect each other (cross-ply configuration). The belt cover 143 is constituted by a plurality of cords formed from steel or an organic fiber material covered by coating rubber and subjected to a rolling process. The belt cover 143 has a belt angle, as an absolute value, of from 0 degrees to 10 degrees. The belt cover 143 is disposed in a layered manner outward of the cross belts 141, 142 in the tire radial direction.

The tread rubber 15 is disposed outward of the carcass layer 13 and the belt layer 14 in the tire radial direction, and constitutes a tread portion. The pair of sidewall rubbers 16, 16 are disposed outward of the carcass layer 13 in the tire lateral direction and constitute left and right sidewall portions. The pair of rim cushion rubbers 17, 17 are disposed inward of the left and right bead cores 11, 11 and the turned back portion of the carcass layer 13 in the tire radial direction. The pair of rim cushion rubbers 17, 17 constitute the contact surfaces of the left and right bead portions with the rim flanges.

Tread Pattern

Figure 2:
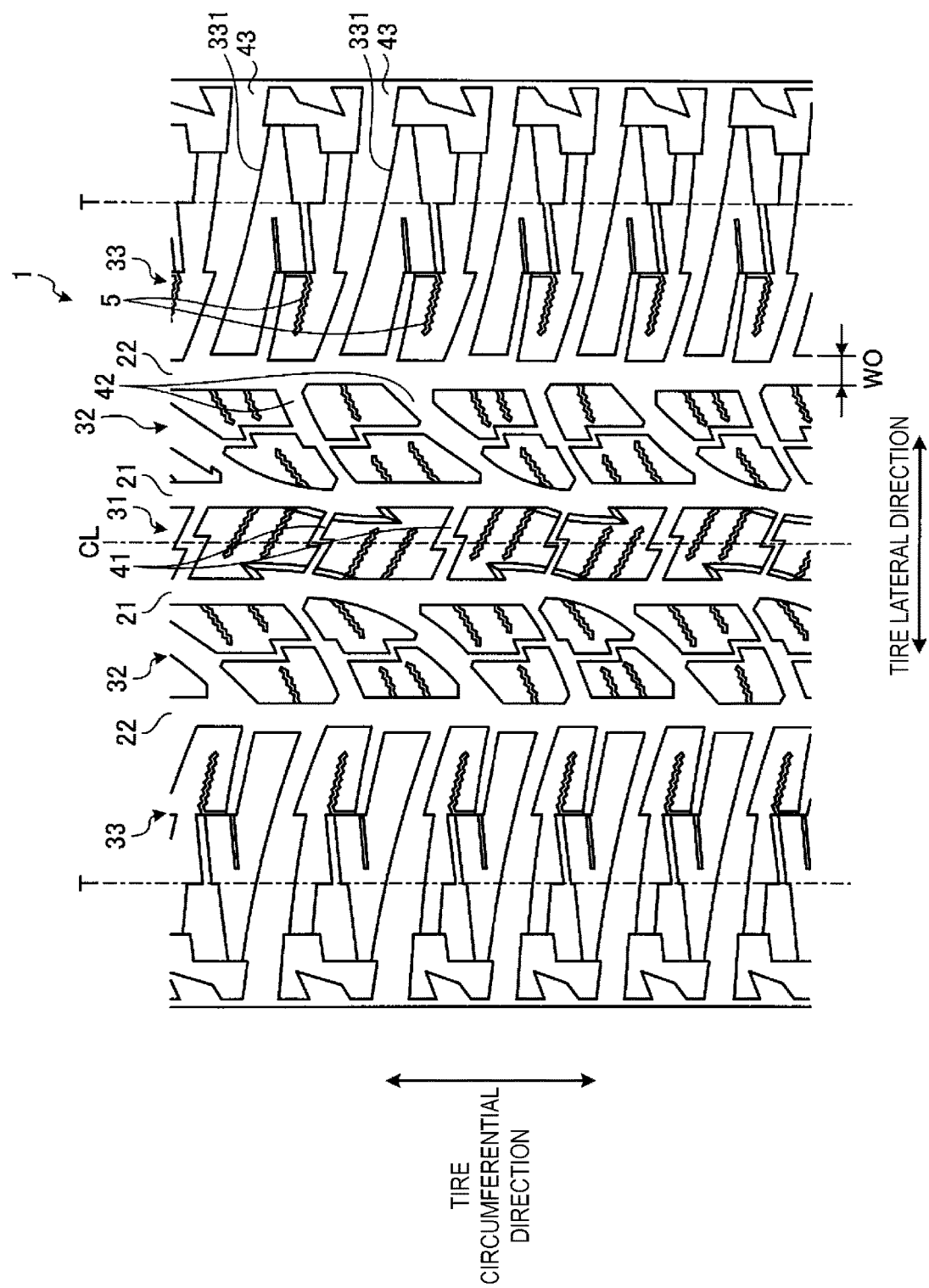
FIG. 2 is a plan view illustrating a tread surface of the pneumatic tire illustrated in FIG. 1.

FIG. 2 is a plan view illustrating a tread surface of the pneumatic tire illustrated in FIG. 1. FIG. 2 illustrates a tread pattern for an all-season tire. In reference to FIG. 2, "tire circumferential direction" refers to the direction revolving about the tire rotational axis. Note that the reference sign T denotes the tire ground contact edge.

As illustrated in FIG. 2, the pneumatic tire 1 is provided with, in the tread portion, a plurality of circumferential main grooves 21, 22 extending in the tire circumferential direction, a plurality of land portions 31 to 33 defined by the circumferential main grooves 21, 22, and a plurality of lug grooves 41 to 43 disposed in the land portions 31 to 33.

"Circumferential main groove" refers to a circumferential groove with a wear indicator that indicates the terminal stage of wear that typically has a groove width of 5.0 mm or greater and a groove depth of 7.5 mm or greater. Moreover, "lug groove" refers to a lateral groove having a groove width of 2.0 mm or greater and a groove depth of 3.0 mm or greater. Additionally, "sipe", which is described below, refers to a cut formed in a land portion that typically has a sipe width of less than 1.5 mm.

The groove width is the maximum distance between the left and right groove walls at the groove opening portion and is measured with the tire mounted on a specified rim, inflated to a specified internal pressure, and being in an unloaded state. In configurations in which the land portions include notched portions or chamfered portions on the edge portions thereof, the groove width is measured with reference to the points where the tread ground contact surface and extension lines of the groove walls meet, when viewed in a cross-section normal to the groove length direction. Additionally, in configuration in which the grooves extend in a zigzag-like or wave-like manner in the tire circumferential direction, the groove width is measured with reference to the center line of the amplitude of the groove walls.

The groove depth is the maximum distance from the tread ground contact surface to the groove bottom and is measured with the tire mounted on a specified rim, inflated to a specified internal pressure, and being in an unloaded state. Additionally, in configurations in which the grooves include an uneven portion or sipes on the groove bottom, the groove depth is measured excluding these portions.

"Specified rim" refers to an "applicable rim" as defined by the Japan Automobile Tyre Manufacturers Association Inc. (JATMA), a "Design Rim" as defined by the Tire and Rim Association, Inc. (TRA), or a "Measuring Rim" as defined by the European Tyre and Rim Technical Organisation (ETRTO). Additionally, "specified internal pressure" refers to a "maximum air pressure" as defined by JATMA, to the maximum value in "TIRE LOAD LIMITS AT VARIOUS COLD INFLATION PRESSURES" as defined by TRA, and to "INFLATION PRESSURES" as defined by ETRTO. Additionally, "specified load" refers to a "maximum load capacity" as defined by JATMA, the maximum value in "TIRE LOAD LIMITS AT VARIOUS COLD INFLATION PRESSURES" as defined by TRA, and a "LOAD CAPACITY" as defined by ETRTO. However, in the case of JATMA, for a passenger vehicle tire, the specified internal pressure is an air pressure of 180 kPa, and the specified load is 88% of the maximum load capacity.

For example, four circumferential main grooves 21, 22 are disposed with left-right symmetry relative to the tire equatorial plane CL in the configuration of FIG. 2. Additionally, five land portions 31 to 33 are defined by the four circumferential main grooves 21, 22. One of the land portions 31 is disposed on the tire equatorial plane CL.

However, the present technology is not limited to such a configuration and five or more circumferential main grooves may be disposed (not illustrated). Additionally, the circumferential main grooves 21, 22 may be disposed with left-right asymmetry relative to the tire equatorial plane CL (not illustrated). Additionally, the circumferential main grooves 21, 22 may be disposed on the tire equatorial plane CL (not illustrated). Accordingly, the land portion 31 can be disposed at a position away from the tire equatorial plane CL.

Additionally, in the configuration of FIG. 2, four circumferential main grooves 21, 22 have an overall straight shape, and the left and right land portions 31 to 33 have edge portions that project toward the circumferential main grooves 21, 22, thus rendering the groove walls of the circumferential main grooves 21, 22 into a shape-like shape in the tire circumferential direction.

However, the present technology is not limited to such a configuration, and the circumferential main grooves 21, 22 may have a simply straight shape or a zigzag shape or a wave-like shape that bends or curves as it extends in the tire circumferential direction (not illustrated).

Here, the left and right circumferential main grooves 22, 22 located outermost in the tire lateral direction are referred to as outermost circumferential main grooves. Additionally, the left and right outermost circumferential main grooves 22, 22 act as boundaries that define the tread portion center region and the tread portion shoulder regions.

Also, the left and right land portions 33, 33 that are defined by the left and right outermost circumferential main grooves 22, 22 are referred to as shoulder land portions. The left and right shoulder land portions 33, 33 are disposed on the left and right tire ground contact edge T, T. Also, the left and right land portions 32, 32 located inward in the tire lateral direction that are defined by the left and right outermost circumferential main grooves 22, 22 are referred to as second land portions. The second land portions 32 are located adjacent to the outermost circumferential main grooves 22. Furthermore, the land portion 31 located inward of the left and right second land portions 32, 32 in the tire lateral direction is referred to as a center land portion. In the configuration of FIG. 2, only one center land portion 31 is provided. However, in configuration in which five or more circumferential main grooves are provided, a plurality of center land portions 31 may be provided.

In the configuration of FIG. 2, the land portions 31 to 33 each include the plurality of lug grooves 41 to 43, respectively, that extend in the tire lateral direction. The lug grooves 41 to 43 have an open structure in which the lug grooves 41 to 43 penetrate through the land portions 31 to 33 in the tire lateral direction, and are arranged with a predetermined pitch in the tire circumferential direction. Thus, the land portions 31 to 33 are divided in a plurality of blocks in the tire circumferential direction by the lug grooves 41 to 43, forming rows of blocks.

However, the present technology is not limited to such a configuration, and, for example, at least one of the lug grooves 41 to 43 may have a semi-closed structure in which the lug grooves 41 to 43 terminate within the corresponding land portion 31 to 33 at one end portion (not illustrated). In such a configuration, the land portions 31 to 33 are formed as ribs that extend continuously in the tire circumferential direction.

Additionally, in the configuration of FIG. 2, as described above, the tread pattern of the pneumatic tire 1 is provided with a plurality of blocks defined in a grid-like shape by the plurality of circumferential main grooves 21, 22 and the plurality of lug grooves 41 to 43.

However, the present technology is not limited to such a configuration, and, for example, the tread pattern of the pneumatic tire 1 may be provided with a plurality of inclined main grooves extending in an inclined manner with respect to the tire circumferential direction and a plurality of blocks defined by the inclined main grooves (not illustrated).

Shoulder Land Portions

Figure 3:
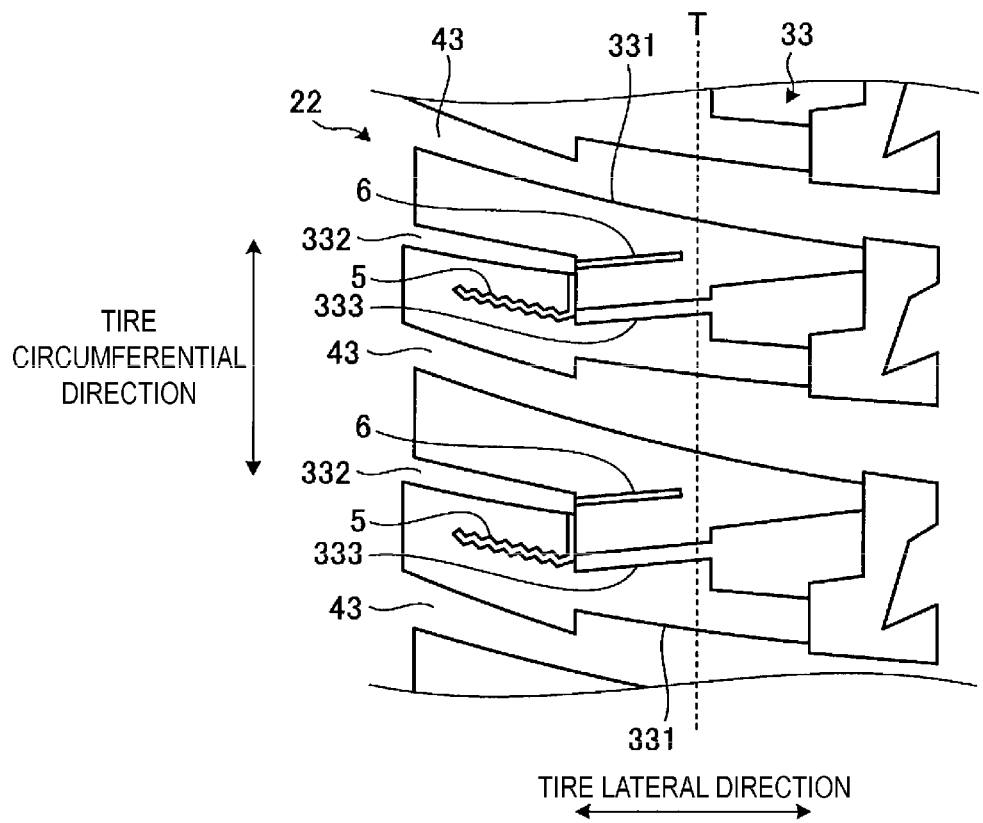
FIG. 3 is a plan view illustrating a shoulder land portion of the pneumatic tire 1 illustrated in FIG. 2.
Figure 4:
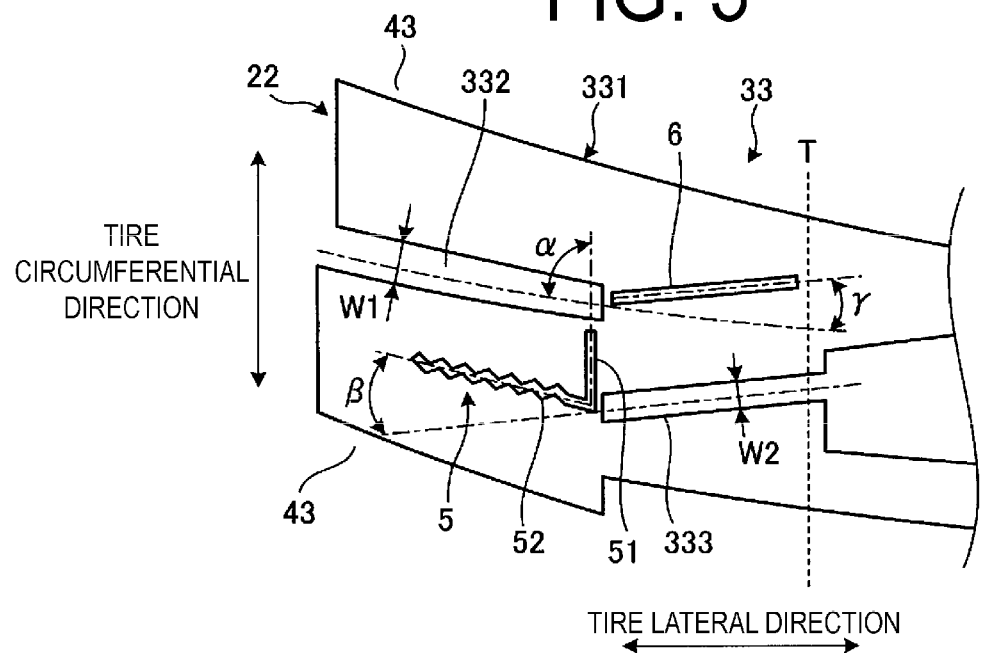
FIG. 4 is a plan view illustrating a single block in the shoulder land portion illustrated in FIG. 3.

FIG. 3 is a plan view illustrating a shoulder land portion of the pneumatic tire illustrated in FIG. 2. FIG. 4 is a plan view illustrating a single block in the shoulder land portion illustrated in FIG. 3.

As illustrated in FIG. 3, in the pneumatic tire 1, the shoulder land portion 33 is provided with the plurality of lug grooves 43 that penetrate through the shoulder land portion 33 in the tire lateral direction. Additionally, the lug grooves 43 are disposed at predetermined intervals in the tire circumferential direction, thus defining a plurality of blocks 331 in the shoulder land portion 33. The blocks 331 are arranged on the tire ground contact edge T.

For example, in the configuration of FIG. 3, the lug grooves 43 of the shoulder land portion 33 open to the outermost circumferential main groove 22 at one end portion and open to the tread edge at the other end portion, penetrating through the shoulder land portion 33 in the tire lateral direction. Additionally, the lug grooves 43 extend in the tire lateral direction with a gentle curve in the tire circumferential direction. One groove wall of each of the lug grooves 43 has a step-like shape within the tire ground contact surface. As a result, the groove width of the lug grooves 43 increases in a step-like manner as it extends outward in the tire lateral direction. Additionally, the lug grooves 43 define the plurality of blocks 331, thus forming a row of blocks. The blocks 331 are arranged in a row on the tire ground contact edge T.

Note that "tire ground contact edge T" refers to a maximum width position in the tire axial direction of a contact surface between the tire and a flat plate when the tire is mounted on a specified rim, inflated to the specified internal pressure, placed vertically on the flat plate in a static state, and loaded with a load corresponding to the specified load.

Shoulder Land Portion Lateral Grooves

Additionally, as illustrated in FIG. 3, the blocks 331 of the pneumatic tire 1 are each provided with a first lateral groove 332 and a second lateral groove 333 that extend in the tire lateral direction. The lateral grooves 332, 333 provide increased wet performance and snow performance to the tire.

For example, in the configuration of FIG. 3, the first lateral groove 332 has a semi-closed structure in which the first lateral groove 332 opens to the edge portion inward of the block 331 in the tire lateral direction (on the side proximal to the outermost circumferential main groove 22) at one end portion and terminates within the tire ground contact surface of the block 331 at the other end portion. Additionally, the second lateral groove 333 has a semi-closed structure in which the second lateral groove 333 terminates within the ground contact surface of the block 331 at one end portion and extends beyond the tire ground contact edge T to the tread edge at the other end. Accordingly, the second lateral groove 333 opens to the tire ground contact edge T. Additionally, the first lateral groove 332 and the second lateral groove 333 extend at an incline with a predetermined inclination angle with respect to the lug grooves 43.

The positions of the first lateral groove 332 and the second lateral groove 333 are staggered in the tire circumferential direction. Additionally, in the block 331, the terminating end portion of the first lateral groove 332 and the terminating end portion of the second lateral groove 333 share the same position in the tire lateral direction. Accordingly, the rigidity of the blocks 331 is made uniform, and uneven wear of the blocks 331 is suppressed.

Additionally, the groove depth $H1$ of the first lateral groove 332 and the groove depth $H0$ (not illustrated) of the outermost circumferential main groove 22 preferably have the relationship:

$0.3 \leq H1/H0 \leq 0.6$. This ensures the function of the first lateral grooves 332 and the rigidity of the blocks 331.

Additionally, the groove depth $H1$ of the first lateral groove 332 is preferably greater than the groove depth $H2$ of the second lateral groove 333 (not illustrated). Specifically, the groove depth $H1$ of the first lateral groove 332 and the groove depth $H2$ of the second lateral groove 333 preferably have the relationship:

$1.1 \leq H1/H2 \leq 2.5$. This makes the ratio $H1/H2$ between the groove depths of the lateral grooves 332, 333 appropriate.

The groove depths $H1$, $H2$ of the lateral grooves 332, 333 are the maximum groove depths. Additionally, in configurations in which the lateral grooves include an uneven portion or sipes on the groove bottom, the groove depth is measured excluding these portions.

Additionally, the groove width $W1$ of the first lateral groove 332 and the groove width $W0$ (not illustrated) of the outermost circumferential main groove 22 preferably have the relationship: $0.3 \leq W1/W1 \leq 0.7$. This ensures the function of the first lateral grooves 332 and the rigidity of the blocks 331.

Additionally, as illustrated in FIG. 4, the groove width W1 of the first lateral groove 332 is preferably greater than the groove width W2 of the second lateral groove 333. Specifically, the groove width W1 of the first lateral groove 332 and the groove width W2 of the second lateral groove 333 preferably have the relationship: $1.1 \leq W1/W2 \leq 2.0$.

This makes the ratio W1/W2 between the groove widths of the lateral grooves 332, 333 appropriate.

The groove widths W1, W2 are the maximum distances between the left and right groove walls at the groove opening portion and is measured with the tire mounted on a specified rim, inflated to a specified internal pressure, and being in an unloaded state.

As described above, by the groove depth H1 and the groove width W1 of the first lateral groove 332 being greater than the groove depth H2 and the groove width W2 of the second lateral groove 333, the first lateral groove 332 that opens to the outermost circumferential main groove 22 can have a large volume. As a result, snow performance of the tire is improved. Note that the difference in rigidity between the region of the block 331 proximal to the outermost circumferential main groove 22 (the side where the first lateral groove 332 is disposed) and the region proximal to the tire ground contact edge T (the side where the second lateral groove 333 is disposed) caused by the different groove volumes described above can be adjusted via the sipes 5, 6 described below.

Shoulder Land Portion Sipes

Figure 5:
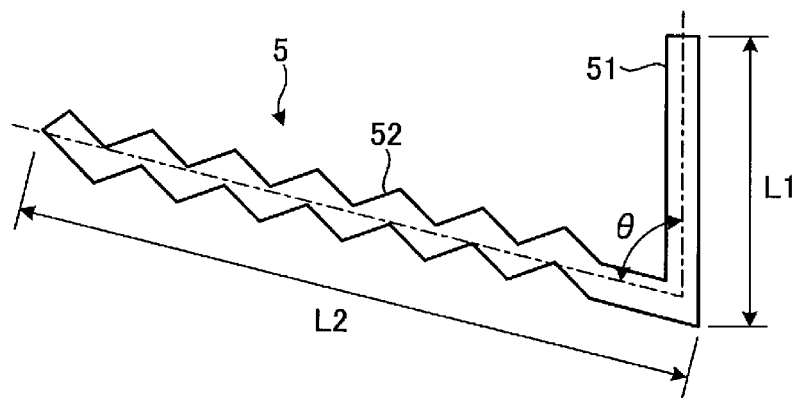
FIG. 5 is an explanatory diagram illustrating a sipe illustrated in FIG. 4.
Figure 6:
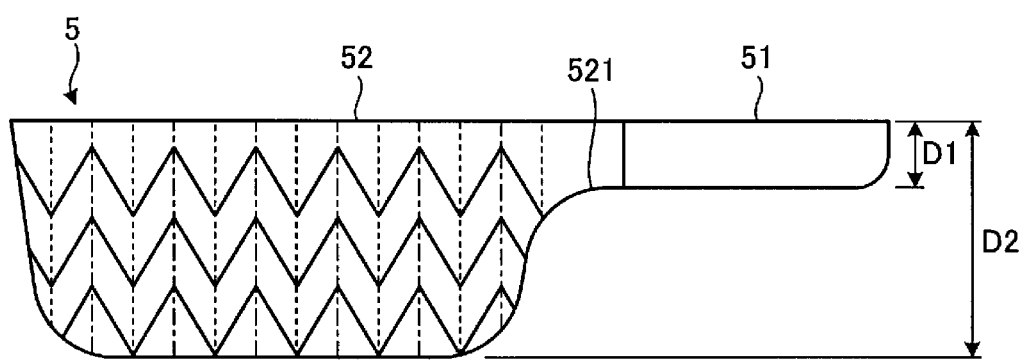
FIG. 6 is an explanatory diagram illustrating the sipe illustrated in FIG. 4.

FIGS. 5 and 6 are explanatory diagrams illustrating the sipes illustrated in FIG. 4. FIG. 5 is an enlarged plan view illustrating a sipe 5. FIG. 6 is a developed view illustrating a wall surface of the sipe 5.

As illustrated in FIGS. 3 and 4, in the pneumatic tire 1, the blocks 331 of the shoulder land portions 33 are provided with a sipe (main sipe) 5 and an auxiliary sipe 6. By providing the sipes 5, 6, the edge components of the blocks 331 increase and snow performance of the tire is improved.

The sipe 5 includes a two-dimensional sipe portion 51 that extends in the tire circumferential direction and a three-dimensional sipe portion 52 that extends in the tire lateral direction. The two-dimensional sipe portion 51 and the three-dimensional sipe portion 52 are connected to each other. The sipe 5 may have an L-shape (see FIG. 5), a T-shape, or a cross-like shape (not illustrated). Additionally, the blocks 331 may each include a plurality of sipes 5.

The two-dimensional sipe portion 51 includes a sipe wall surface with a straight shape when viewed in a cross-section normal to the sipe length direction (when viewed in a cross-section that includes the sipe width direction and the sipe depth direction). The two-dimensional sipe portion 51 is only required to have a straight shape when viewed in the cross-section described above, and may have a straight shape, a zigzag shape, a wave-like shape, or an arc shape in the sipe length direction (when viewed in a cross-section normal to the sipe depth direction). The three-dimensional sipe portion 52 includes a sipe wall surface with a bent shape having an amplitude in the sipe width direction when viewed in a cross-section normal to the sipe length direction and normal to the sipe depth direction. Compared to the two-dimensional sipe portion 51, the three-dimensional sipe portion 52 has a greater meshing force between opposing sipe wall surfaces and, therefore, act to reinforce the rigidity of the land portions. The three-dimensional sipe portion 52 is only required to have the structure described above at the sipe wall surface, and may have a straight shape, a zigzag shape, a wave-like shape, or an arc shape, for example, at the tread ground contact surface.

Additionally, the sipe 5 may have a closed structure in which the sipe 5 terminates within the block 331 at both end portions (see FIG. 4), a semi-closed structure in which the sipe 5 terminates within the block 331 at one end portion and opens to the edge portion of the block 331 or tire ground contact edge T at the other end portion, or an open structure in which the sipe 5 opens to the edge portion of the block 331 or the tire ground contact edge T at both end portions (not illustrated).

For example, in the configuration of FIG. 4, the sipe 5 has an L-shape with one end portion of the two-dimensional sipe portion 51 connecting to one end portion of the three-dimensional sipe portion 52. Specifically, an angle θ (see FIG. 5) formed by the two-dimensional sipe portion 51 and the three-dimensional sipe portion 52 is in the range: $-80$ degrees$\leq \theta \leq 100$ degrees. As a result, a bent portion is formed, thus increasing the edge components of the block 331. Additionally, the sipe 5 has a closed structure in which both end portions of the sipe 5 (one end portion of the two-dimensional sipe portion 51 and one end of the three-dimensional sipe portion 52) terminate within the block 331. Thus, the rigidity of the blocks 331 is increased.

Note that in configurations in which the sipe portions 51, 52 have a zigzag shape (see, for example, the three-dimensional sipe portion 52 of FIG. 4), a wave-like shape or an arc shape (not illustrated), the angle θ is measured with reference to an imaginary line connecting both end portions of the three-dimensional sipe portion 52 in the overall extension direction.

Additionally, the two-dimensional sipe portion 51 has a straight shape at the tread ground contact surface (see FIG. 5) and extends at an incline with respect to the tire circumferential direction within a range of ±10 degrees so as to be substantially parallel with the tire circumferential direction. The two-dimensional sipe portion 51 is disposed in the central portion of the block 331 (a region from 40% to 60% of the ground contact width of the block 331 from the tire ground contact edge T).

Additionally, the three-dimensional sipe portion 52 has a zigzag shape at the tread ground contact surface (see FIG. 5) and extends at an incline with respect to the tire lateral direction in a range of ±10 degrees so as to be substantially parallel with the tire lateral direction. The three-dimensional sipe portion 52 extends inward in the tire lateral direction from the two-dimensional sipe portion 51. Thus, the three-dimensional sipe portion 52 is disposed inward in the tire lateral direction from the central portion of the block 331. As a result, the rigidity of the laterally inner region of the block 331 is increased.

Additionally, as illustrated in FIG. 6, the three-dimensional sipe portion 52 includes a raised bottom portion 521 at the connection portion with the two-dimensional sipe portion 51. This configuration allows the connection portion of the two-dimensional sipe portion 51 and the three-dimensional sipe portion 52 to be reinforced, and thus suppressing cracking originating in the connection portion. Note that in the raised bottom portion 521, the wall surface of the three-dimensional sipe portion 52 is flat.

In the configuration of FIG. 3, as described above, by providing the block 331 with the sipe 5, the edge components of the block 331 are increased and the snow performance of the tire is improved. In particular, by providing the sipe 5 with the three-dimensional sipe portion 52 that extends in the tire lateral direction, the edge components of the block 331 are increased thus improving the snow performance of the tire, and the rigidity of the block 331 is ensured thus improving the wear resistance performance of the tire.

Additionally, by providing the sipe 5 with the two-dimensional sipe portion 51 that extends in the tire circumferential direction, the rigidity balance of the block 331 changed by the three-dimensional sipe portion 52 is made uniform, and uneven wear of the block 331 is suppressed. As a result, the uneven wear resistance performance of the tire is improved.

Additionally, by the sipe 5 having a structure in which the two-dimensional sipe portion 51 that extends in the tire circumferential direction and the three-dimensional sipe portion 52 that extends in the tire lateral direction are connected, the rigidity of the block 331 and edge components of the block 331 are increased compared to a configuration with a sipe that extends only in the tire lateral direction or tire circumferential direction. As a result, wear of the block 331 is suppressed, improving the wear resistance performance of the tire, and snow performance of the tire is improved.

Note that in the configuration of FIGS. 3 and 4, the sipe length L1 of the two-dimensional sipe portion 51 and the sipe length L2 of the three-dimensional sipe portion 52 preferably have the relationship: $0.2 \leq L1/L2 \leq 0.8$, and more preferably have the relationship: $0.3 \leq L1/L2 \leq 0.6$ (see FIG. 5). As a result, the sipe length L1 of the two-dimensional sipe portion 51 is made appropriate.

The sipe lengths L1, L2 are the distances between both end portions of the sipe portions at the block road contact surface. Accordingly, in configurations in which the sipe portions have a zigzag shape or an arc shape, the sipe lengths L1, L2 are the distances between both end portions of the zigzag shape or the arc shape.

Additionally, the sipe depth D1 of the two-dimensional sipe portion 51 and the sipe depth D2 of the three-dimensional sipe portion 52 preferably have the relationship: $0.1 \leq D1/D2 \leq 0.6$, and more preferably have the relationship: $0.2 \leq D1/D2 \leq 0.4$ (see FIG. 6). This configuration allows the sipe depth D1 of the two-dimensional sipe portion 51 to be made appropriate.

The sipe depths D1, D2 are the maximum depths of the sipe portions. Accordingly, in configuration in which the sipe portions include raised bottom portions, the sipe depths are measured excluding the position of the raised bottom portion.

Additionally, in the configuration of FIG. 4, the two-dimensional sipe portion 51 extends from the laterally outer end portion of the first lateral groove 332 to the laterally inner end portion of the second lateral groove 333. The two-dimensional sipe portion 51 and the first lateral groove 332 do not communicate, and a small gap is disposed between the two at the block road contact surface. In a similar manner, the two-dimensional sipe portion 51 and the second lateral groove 333 do not communicate, and a small gap is disposed between the two. Accordingly, when the tire is vulcanization molded, a path for air in the sipe end portion to escape is ensured, and poor vulcanization of the block is less likely to occur. Specifically, the distance G1 (the reference sign is omitted in the drawings) from the two-dimensional sipe portion 51 to the lateral grooves 332, 333 is preferably in the range: $0.1 \text{ mm} \leq G1 \leq 0.4 \text{ mm}$. Additionally, the maximum value for the distance G1 is more preferably in the range: $G1 \leq 1.0 \text{ mm}$. This configuration allows the gap between the two-dimensional sipe portion 51 and the lateral grooves 332, 333 to be made appropriate.

Additionally, in the configuration of FIG. 4, the three-dimensional sipe portion 52 extends inward in the tire lateral direction from the laterally inner end portion of the second lateral groove 333. The three-dimensional sipe portion 52 and the second lateral groove 333 do not communicate, and a small gap is disposed between the two at the block road contact surface. Accordingly, when the tire is vulcanization molded, a path for air in the sipe end portion to escape is ensured, and poor vulcanization of the block is less likely to occur. Specifically, the distance G2 (the reference sign is omitted in the drawings) from the three-dimensional sipe portion 52 to the second lateral groove 333 is preferably in the range: $0.1 \text{ mm} \leq G2 \leq 0.4 \text{ mm}$. Additionally, the maximum value for the distance G2 is more preferably in the range: $G2 \leq 1.0 \text{ mm}$. This configuration allows the gap between the three-dimensional sipe portion 52 and the second lateral groove 333 to be made appropriate.

Note that the present technology is not limited to such a configuration, and, for example, a configuration may be employed in which the two-dimensional sipe portion 51 and the lateral grooves 332, 333 are in contact at the tread ground contact surface, forming a non-continuous block (not illustrated). In a similar manner, a configuration may be employed in which the three-dimensional sipe portion 52 and the second lateral groove 333 are in contact at the tread ground contact surface, forming a non-continuous block (not illustrated). Either of these configurations can make poor vulcanization of the blocks less likely to occur.

Additionally, as illustrated in FIG. 4, the inclination angle $\alpha$ of the first lateral groove 332 with respect to the two-dimensional sipe portion 51 is preferably in the range: $80 \text{ degrees} \leq \alpha \leq 100 \text{ degrees}$. This configuration allows the angle at which the two-dimensional sipe portion 51 and the first lateral groove 332 are disposed to be made appropriate.

Additionally, as illustrated in FIG. 4, the inclination angle $\beta$ of the second lateral groove 333 with respect to the three-dimensional sipe portion 52 is preferably in the range: $0 \text{ degrees} \leq \beta \leq 10 \text{ degrees}$. This configuration allows the angle at which the three-dimensional sipe portion 52 and the second lateral groove 333 are disposed to be made appropriate.

The inclination angles $\alpha$, $\beta$ are the angles formed by the center lines of the sipe portions 51, 52 and the center lines of the lateral grooves 332, 333 at the block road contact surface.

The auxiliary sipe 6 extends to the tire ground contact edge T, extending from the two-dimensional sipe portion 51 outward in the tire lateral direction.

For example, in the configuration of FIG. 4, the auxiliary sipe 6 is a two-dimensional sipe (flat sipe) and has a straight shape at the block road contact surface. Additionally, the auxiliary sipe 6 extends in the tire lateral direction, extending from the laterally outer end portion of the first lateral groove 332 and terminates within the ground contact surface of the block 331. The inclination angle $\gamma$ of the auxiliary sipe 6 with respect to the first lateral groove 332 is preferably in a range: $0 \text{ degrees} \leq \gamma \leq 10 \text{ degrees}$. This configuration allows the angle at which the auxiliary sipe 6 and the first lateral groove 332 are disposed to be made appropriate. Additionally, the auxiliary sipe 6 preferably terminates within the ground contact surface of the block 331 without opening to the tire ground contact edge T. This configuration allows the rigidity of the block 331 at the tire ground contact edge T to be ensured.

The inclination angle $\gamma$ is the angle formed by the center line of the auxiliary sipe 6 and the center line of the first lateral groove 332 at the block road contact surface.

Specific Examples of Three-dimensional Sipe

FIGS. 7 to 10 are explanatory diagrams illustrating examples of three-dimensional sipes. FIGS. 7 to 10 are transparent perspective views of wall surfaces of three-dimensional sipes on one side. The three-dimensional sipe portion 52 of the sipe 5 may have any of the structures illustrated in FIGS. 7 to 10.

Figure 7:
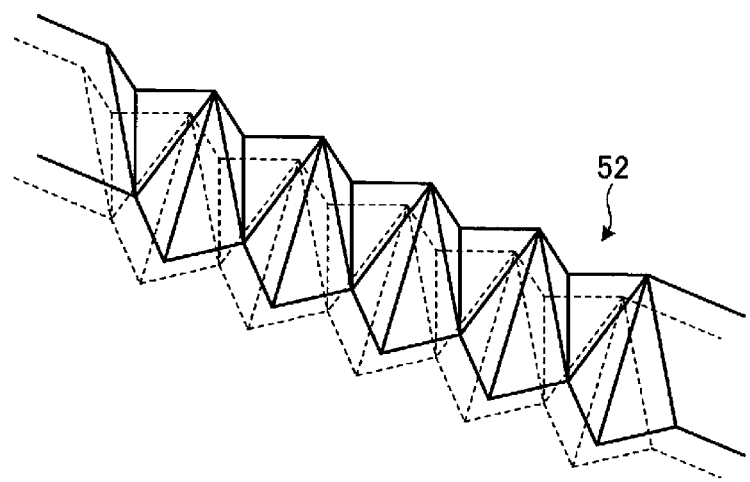
FIG. 7 is an explanatory diagram illustrating an example of a three-dimensional sipe.

In the three-dimensional sipe portion 52 of FIG. 7, the sipe wall surface has a structure in which pyramids and inverted pyramids are connected in the sipe length direction. In other words, the sipe wall surface is formed by mutually offsetting in the tire lateral direction the pitches of a zigzag form located proximal to the tread surface and a zigzag form located proximal to the bottom side so that mutually opposing protrusions and recesses are formed by the zigzag forms on the tread surface side and the bottom side. Additionally, in the recesses and protrusions, when viewed in a tire rotating direction, the sipe wall surface is formed by connecting a protrusion inflection point on the tread surface side to a recess inflection point on the bottom side, a recess inflection point on the tread surface side to a protrusion inflection point on the bottom side, and protrusion inflection points mutually adjacent to the protrusion inflection point on the tread surface side and the protrusion inflection point on the bottom side with ridge lines; and connecting these ridge lines with consecutive planes in the tire lateral direction. Additionally, a first sipe wall surface has an uneven surface with convex pyramids and inverted pyramids arranged alternating in the tire lateral direction; and a second sipe wall surface has an uneven surface with concave pyramids and inverted pyramids arranged alternating in the tire lateral direction. Furthermore, the uneven surface of the sipe wall surface is oriented toward outside the blocks at at least the outer ends of the sipe. Note that examples of such a three-dimensional sipe include the technology described in Japanese Patent No. 3894743.

Figure 8:
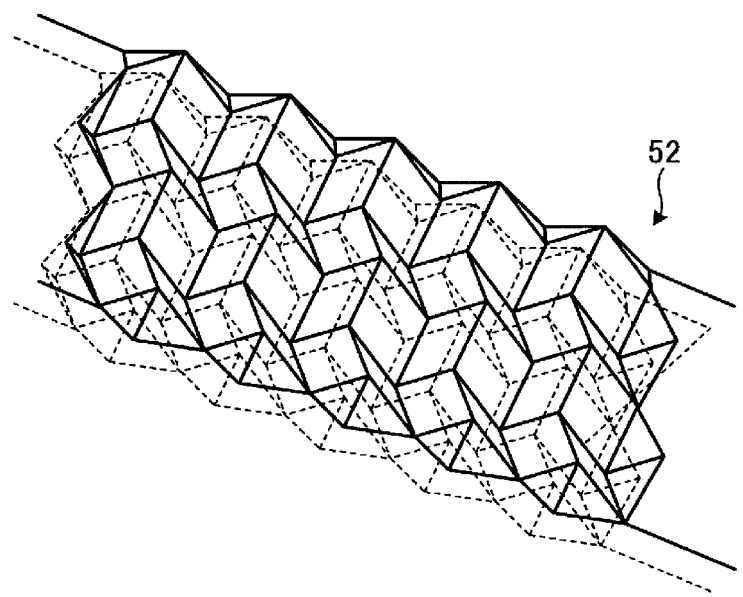
FIG. 8 is an explanatory diagram illustrating an example of a three-dimensional sipe.

Additionally, in the three-dimensional sipe portion 52 of FIG. 8, the sipe wall surface has a structure in which a plurality of prism shapes having a block form are connected in the sipe depth direction and the sipe length direction while inclining with respect to the sipe depth direction. In other words, the sipe wall surface has a zigzag form at the tread surface. Additionally, the sipe wall surface has bent portions in at least two locations in the tire radial direction in the blocks that bend in the tire circumferential direction and are connected in the tire lateral direction. Moreover, these bent portions have a zigzag form with amplitude in the tire radial direction. Additionally, while, in the sipe wall surface, the amplitude is constant in the tire circumferential direction, an inclination angle in the tire circumferential direction with respect to a normal line direction of the tread surface is smaller at a portion on the sipe bottom side than at a portion on the tread surface side; and the amplitude in the tire radial direction of the bent portion is greater at a portion on the sipe bottom side than at a portion on the tread surface side. Note that examples of such a three-dimensional sipe portions include the technology described in Japanese Patent No. 4316452.

Figure 9:
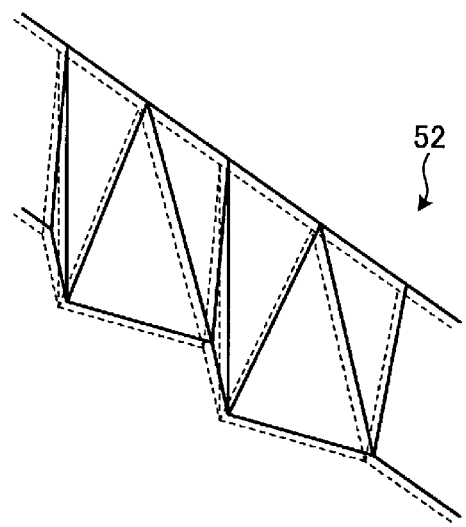
FIG. 9 is an explanatory diagram illustrating an example of a three-dimensional sipe.

The three-dimensional sipe portion 52 of FIG. 9 has an opening that has a linear shape or an arc shape as seen in a plan view of the road contact surface of the land portion. The three-dimensional sipe has a wave-like shape in which a curved line or a bent line repeats from a first end to a second end while the amplitude gradually increases as the sipe depth increases from the opening down to a wear position of at least 80% of the land portion. Moreover, when perpendicular lines are drawn to a predetermined sipe depth position from both ends of the three-dimensional sipe to a center line that passes through the center of the amplitude of the wave-like shape of the three-dimensional sipe, the distance between the feet of these lines is referred to as the sipe length L (not illustrated). The sipe length L becomes correspondingly shorter as the sipe depth increases. Moreover, when a periphery length (actual length) of a sipe at the road contact surface of the land portion is M0 mm, and the sipe length L at the 80% wear position is L80 mm, the periphery length of the sipe at the 80% wear position is M80 mm (not illustrated). The ratio L80/M0 and the ratio M80/M0 satisfy the conditions: $0.85 \leq L80/M0 \leq 0.90$ and $1.0 \leq M80/M0 \leq 1.15$. This type of three-dimensional sipe portion is a known technique that is described, for example, in Japanese Unexamined Patent Application Publication No. 2006-56502.

Figure 10:
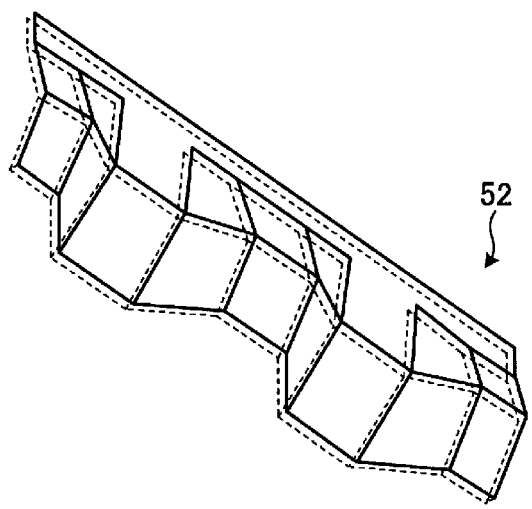
FIG. 10 is an explanatory diagram illustrating an example of a three-dimensional sipe.

The three-dimensional sipe portion 52 of FIG. 10 has a first offset portion that projects toward a first side in the sipe width direction, and a second offset portion that projects toward a second side in the sipe width direction at a position further inward in the tire radial direction than the first offset portion. Moreover, a sipe length L1 (not illustrated) for a new tire and a sipe length L2 (not illustrated) at 80% wear have the relationship of being substantially the same ($0.95 \leq L2/L1 \leq 1.05$). A periphery length M1 (not illustrated) of a sipe for a new tire and a periphery length M2 (not illustrated) of a sipe at 80% wear have the relationship: $1.10 \leq M2/M1 \leq 1.50$. A planar form of a sipe at 80% wear has a parallel portion that is parallel with the planar form of the sipe for a new tire. A total length P2 (not illustrated) of the parallel portion and the sipe length L1 for a new tire has the relationship: $0.20 \leq P2/L1 \leq 0.80$. This type of three-dimensional sipe is a known technique that is described, for example, in Japanese Unexamined Patent Application Publication No. 2009-255688.

Omission of Auxiliary Sipe

Figure 11:
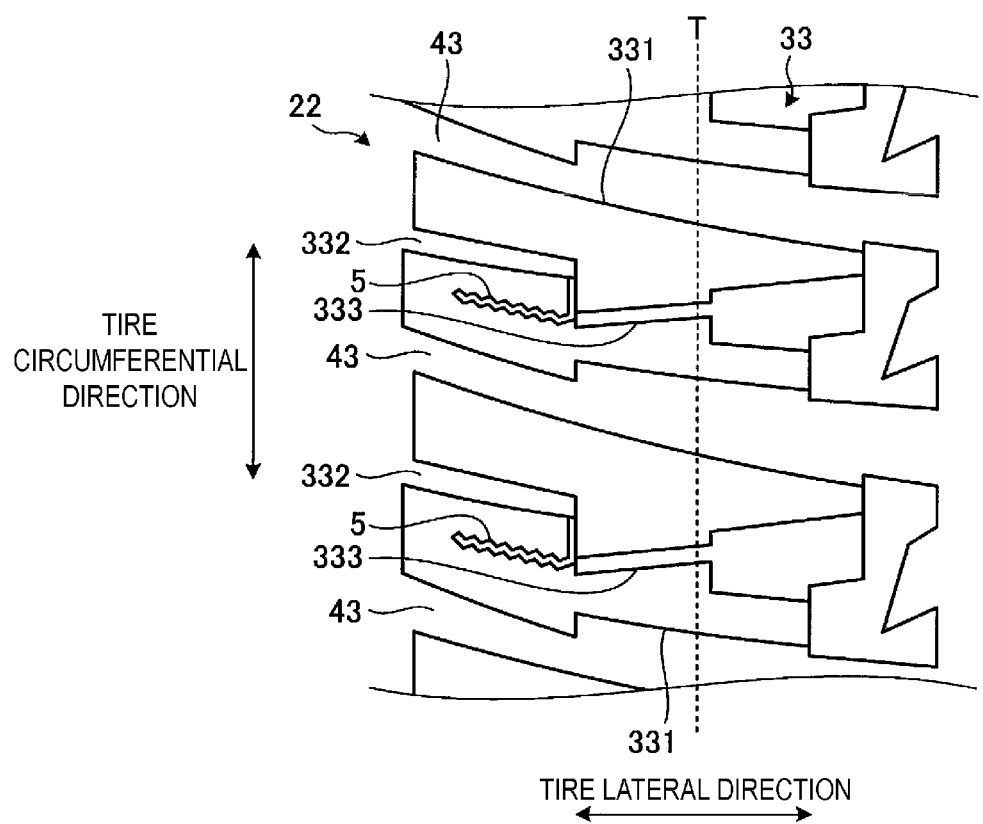
FIG. 11 is an explanatory diagram illustrating a modified example of the pneumatic tire illustrated in FIG. 1.

FIG. 11 is an explanatory diagram illustrating a modified example of the pneumatic tire illustrated in FIG. 1. FIG. 11 illustrates an enlarged cross-sectional view of the shoulder land portion 33.

In the configuration of FIG. 1, as illustrated in FIGS. 3 and 4, the block 331 of the shoulder land portion 33 includes a main sipe 5 and an auxiliary sipe 6. Such a configuration is preferable because the auxiliary sipe 6 provides improved snow performance and wear resistance performance.

Alternatively, as illustrated in FIG. 11, the block 331 of the shoulder land portion 33 may include only the main sipe 5, and the auxiliary sipe 6 may be omitted. Thus, in the configuration of FIG. 11, the block 331 includes only the second lateral groove 333 and no sipes in the region proximal to the tire ground contact edge T of the block road contact surface (a region 40% of the ground contact width of the block 331 from the tire ground contact edge T). Such a configuration is preferable because the rigidity of the region proximal to the tire ground contact edge T of the shoulder land portion 33 increases, and the steering stability performance of the tire improves.

Divided Structure of Main Sipe

Figure 12:
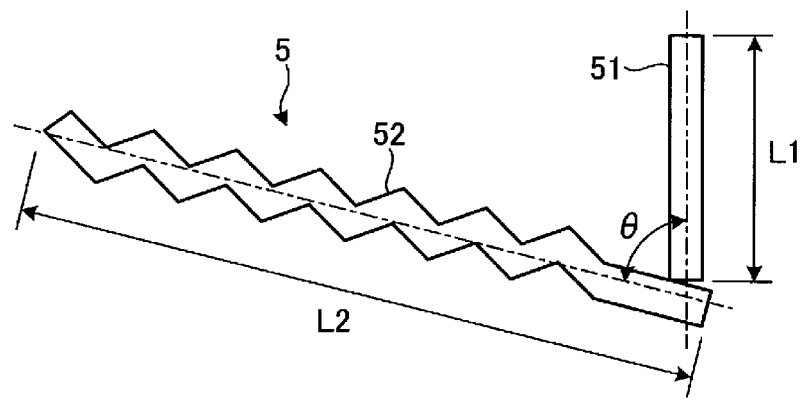
FIG. 12 is an explanatory diagram illustrating a modified example of the pneumatic tire illustrated in FIG. 1.
Figure 13:
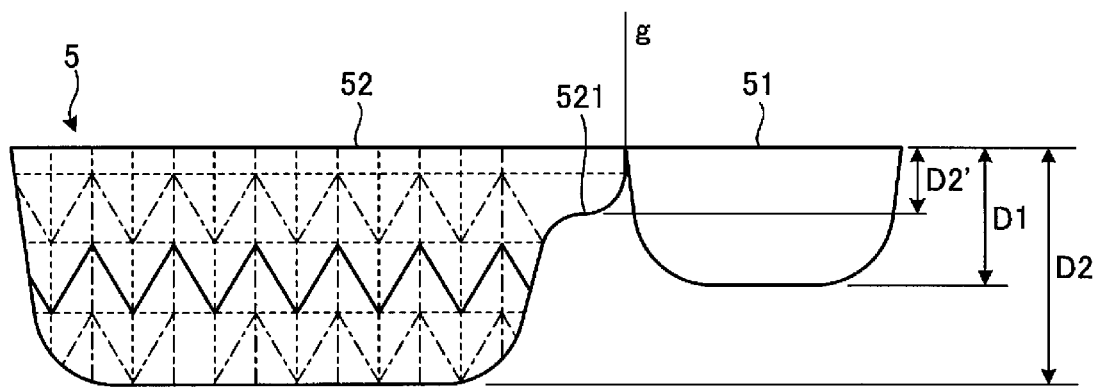
FIG. 13 is an explanatory diagram illustrating a modified example of the pneumatic tire illustrated in FIG. 1.

FIGS. 12 and 13 are explanatory diagrams illustrating modified examples of the pneumatic tire 1 illustrated in FIG. 1. FIG. 12 is an enlarged plan view of the main sipe 5. FIG. 13 is a developed view of the wall surface of the main sipe 5.

In the configuration of FIG. 1, as illustrated in FIGS. 5 and 6, the main sipe 5 has an L-shape with the shorter two-dimensional sipe portion 51 connecting to the longer three-dimensional sipe portion 52. Additionally, the three-dimensional sipe portion 52 includes a raised bottom portion 521 at the connection portion with the two-dimensional sipe portion 51. The depth (dimension character omitted) of the three-dimensional sipe portion 52 at the raised bottom portion 521 is the same of the sipe depth D1 of the two-dimensional sipe portion 51. Thus, the two-dimensional sipe portion 51 and the raised bottom portion 521 of the three-dimensional sipe portion 52 share a sipe bottom and communicate with each other.

Alternatively, in the configuration of FIGS. 12 and 13, the main sipe 5 has an L-shape with the shorter two-dimensional sipe portion 51 and the longer three-dimensional sipe portion 52 disposed proximal to each other. Specifically, the two-dimensional sipe portion 51 and the three-dimensional sipe portion 52 are separated from each other at the tread ground contact surface by a small gap g. The gap g preferably is in the range: 0 mm≤g≤0.2 mm, and more preferably is in the range: 0.01 mm≤g≤0.1 mm. In configurations in which g equals 0 mm, the two-dimensional sipe portion 51 and the three-dimensional sipe portion 52 communicate or are in contact with each other at the tread ground contact surface. By making the gap g small, the edge components of the three-dimensional sipe portions 52 increase snow performance, and the two-dimensional sipes 51 make the rigidity balance of the blocks 331 uniform, thus improving the uneven wear resistance performance of the tire. Additionally, in configurations in which g does not equal 0 mm, the processability of the main sipe 5 having the L-shape is improved.

As illustrated in FIG. 13, the maximum depth D1 of the two-dimensional sipe portion 51 and the depth D2' of the three-dimensional sipe portion 52 at the raised bottom portion 521 from the tread ground contact surface to the sipe bottom have the relationship: D2'≤D1. Thus, the raised bottom portion 521 of the three-dimensional sipe portion 52 is shallower than the two-dimensional sipe portion 51. Additionally, the depths D1, D2' preferably have the relationship: 1.0≤D1/D2'≤3.0, and more preferably have the relationship: 1.5≤D1/D2'≤2.5. Such a configuration can make the rigidity balance of the blocks 331 uniform and have the effect of improving the uneven wear resistance performance of the tire.

Effects

As described above, the pneumatic tire 1 is provided with a plurality of blocks 331 arranged on the tire ground contact edge T (see FIG. 3). The blocks 331 each include a main sipe 5 with an L-shape with a two-dimensional sipe portion 51 that extends in the tire circumferential direction and a three-dimensional sipe portion 52 that extends in the tire lateral direction connected to each other (see FIGS. 4 to 6) or disposed proximal to each other (see FIGS. 12 and 13).

Such a configuration is advantageous because, by the sipe 5 including the three-dimensional sipe portion 52 that extends in the tire lateral direction, edge components of the blocks 331 are increased, thus improving the snow performance of the tire, and the rigidity of the blocks 331 is ensured, thus improving the wear resistance performance of the tire. Additionally, by providing the sipe 5 with the two-dimensional sipe portion 51 that extends in the tire circumferential direction, the rigidity balance of the block 331 changed by the three-dimensional sipe portion 52 is made uniform, and uneven wear of the block 331 is suppressed. Such a configuration is advantageous because the uneven wear resistance performance of the tire is improved.

In the pneumatic tire 1, the two-dimensional sipe portion 51 and the three-dimensional sipe portion 52 have a closed structure in which the two-dimensional sipe portion 51 and the three-dimensional sipe portion 52 terminate within the block 331 (see FIG. 4). Such a configuration is advantageous because the rigidity of the blocks 331 is ensured and the wear resistance performance of the tire is improved.

In the pneumatic tire 1, the angle θ formed by the two-dimensional sipe portion 51 and the three-dimensional sipe portion 52 is in the range: −80 degrees≤θ≤100 degrees (see FIG. 5). Such a configuration is advantageous because the effect increasing the edge components by providing the three-dimensional sipe portion 52 and the action of the two-dimensional sipe portion 51 making the block rigidity uniform are achieved in a compatible manner, and the snow performance and wear resistance performance of the tire are improved.

In the pneumatic tire 1, the sipe length L1 of the two-dimensional sipe portion 51 and the sipe length L2 of the three-dimensional sipe portion 52 have the relationship: 0.2≤L1/L2≤0.8 (see FIG. 5). Such a configuration is advantageous because the sipe length L1 of the two-dimensional sipe portion 51 is made appropriate. In other words, by satisfying the relationship 0.2≤L1/L2, the sipe length L1 of the two-dimensional sipe portion 51 is ensured and the action of the two-dimensional sipe portion 51 making the block rigidity uniform is appropriately ensured. By satisfying the relationship L1/L2≤0.8, the two-dimensional sipe portion 51 is prevented from having an excessive length, and the rigidity of the blocks 331 is appropriately ensured.

In the pneumatic tire 1, the sipe depth D1 of the two-dimensional sipe portion 51 and the sipe depth D2 of the three-dimensional sipe portion 52 have the relationship: 0.1≤D1/D2≤0.6 (see FIG. 6). Such a configuration is advantageous because the sipe depth D1 of the two-dimensional sipe portion 51 is made appropriate. In other words, by satisfying the relationship 0.1≤D1/D2, the sipe depth D1 of the two-dimensional sipe portion 51 is ensured and the action of the two-dimensional sipe portion 51 making the block rigidity uniform is appropriately ensured. By satisfying the relationship D1/D2≤0.6, the two-dimensional sipe portion 51 is prevented from having an excessive depth, and the rigidity of the blocks 331 is appropriately ensured.

In the pneumatic tire 1, the three-dimensional sipe portion 52 includes a raised bottom portion 521 at the connection portion with the two-dimensional sipe portion 51 (see FIG. 6). Such a configuration is advantageous because the raised bottom portion 521 reinforces the connection portion of the two-dimensional sipe portion 51 and the three-dimensional sipe portion 52, thus suppressing cracking originating in the connection portion.

In the pneumatic tire 1, the block 331 includes the first lateral groove 332 that extends in the tire lateral direction and opens to the laterally inner edge portion of the block 331 at one end portion and terminates within the block and the other end portion (see FIG. 4). The two-dimensional sipe portion 51 extends to the terminating end portion of the first lateral groove 332. Such a configuration is advantageous because, by the two-dimensional sipe portion 51 extending to the terminating end portion of the first lateral groove 332, the action of the two-dimensional sipe portion 51 making block rigidity uniform can be appropriate ensured, thus suppressing uneven wear of the blocks 331.

In the pneumatic tire 1, the distance G1 between the two-dimensional sipe portion 51 and the terminating end portion of the first lateral groove 332 is in the range: 0.1 mm≤G1≤1.0 mm (see FIG. 4). This configuration is advantageous because the distance G1 between the two-dimensional sipe portion 51 and the first lateral groove 332 is made appropriate. In other words, by satisfying: 0.1 mm≤G1, a small gap is ensured between the two-dimensional sipe portion 51 and the first lateral groove 332. Thus, air can satisfactorily escape upon tire vulcanization-molding, and poor vulcanization of the block 331 is less likely to occur. By satisfying: G1≤1.0 mm, the two-dimensional sipe portion 51 extends to the terminating end portion of the first lateral groove 332, thus appropriately ensuring the action of the two-dimensional sipe portion 51 making block rigidity uniform.

In the pneumatic tire 1, the inclination angle α of the first lateral groove 332 with respect to the two-dimensional sipe portion 51 is in the range: 80 degrees≤α≤100 degrees. Such a configuration is advantageous because, by the first lateral groove 332 and the two-dimensional sipe portion 51 being disposed at approximately a right angle, the rigidity of the blocks 331 is ensured, and uneven wear of the blocks 331 is suppressed.

In the pneumatic tire 1, the block 331 includes the second lateral groove 333 that extends in the tire lateral direction and terminates within the ground contact surface of the block 331 at one end and opens to the tire ground contact edge T at the other end (see FIG. 4). The three-dimensional sipe portion 52 extends to the terminating end portion of the second lateral groove 333. Such a configuration is advantageous because by the three-dimensional sipe portion 52 extending to the terminating end portion of the second lateral groove 333, the action of increasing the edge components by providing the three-dimensional sipe portion 52 is improved, thus improving the snow performance of the tire.

In the pneumatic tire 1, the distance G2 between the three-dimensional sipe portion 52 and the terminating end portion of the second lateral groove 333 is in the range: 0.1 mm≤G2≤1.0 mm (see FIG. 4). This configuration is advantageous because the distance G2 between the three-dimensional sipe portion 52 and the second lateral groove 333 is made appropriate. In other words, by satisfying: 0.1 mm≤G2, a small gap is ensured between the three-dimensional sipe portion 52 and the second lateral groove 333. Thus, air can satisfactorily escape upon tire vulcanization-molding, and poor vulcanization of the block 331 is less likely to occur. By satisfying: G2≤1.0 mm, the two-dimensional sipe portion 51 extends to the terminating end portion of the second lateral groove 333, thus improving the action of edge components being increased by providing the three-dimensional sipe portion 52.

In the pneumatic tire 1, the inclination angle β of the second lateral groove 333 with respect to the three-dimensional sipe portion 52 is in the range: 0 degrees≤β≤10 degrees (see FIG. 4). Such a configuration is advantageous because by disposing the three-dimensional sipe portion 52 substantially on an extension line of the second lateral groove 333, the position of the three-dimensional sipe portion 52 can be made appropriate.

In the pneumatic tire 1, the block 331 includes the first lateral groove 332 that extends inward in the tire lateral direction from the two-dimensional sipe portion 51 and opens to the laterally inner edge portion of the block 331, and the second lateral groove 333 that extends outward in the tire lateral direction from the two-dimensional sipe portion 51 and opens to the tire ground contact edge T (see FIG. 4). The groove depth H1 of the first lateral groove 332 and the groove depth H2 of the second lateral groove 333 have the relationship: 1.1≤H1/H2≤2.5 (not illustrated). Such a configuration is advantageous because the groove depth ratio H1/H2 of the lateral grooves 332, 333 disposed on the left and right of the two-dimensional sipe portion 51 is made appropriate, thus making appropriate the rigidity of the blocks 331.

In the pneumatic tire 1, the block 331 includes the first lateral groove 332 that extends inward in the tire lateral direction from the two-dimensional sipe portion 51 and opens to the laterally inner edge portion of the block 331, and the second lateral groove 333 that extends outward in the tire lateral direction from the two-dimensional sipe portion 51 and opens to the tire ground contact edge T (see FIG. 4). The groove width W1 of the first lateral groove 332 and the groove width W2 of the second lateral groove 333 have the relationship: 1.1≤W1/W2≤2.0. Such a configuration is advantageous because the groove width ratio W1/W2 of the lateral grooves 332, 333 disposed on the left and right of the two-dimensional sipe portion 51 is made appropriate, thus making appropriate the rigidity of the blocks 331.

The pneumatic tire 1 is provided with an auxiliary sipe 6 that extends outward in the tire lateral direction from the two-dimensional sipe portion 51 to the tire ground contact edge T (see FIG. 4). Such a configuration is advantageous because the rigidity of the blocks 331 in the region from the two-dimensional sipe portion 51 to the tire ground contact edge T is reduced, thus suppressing uneven wear of the blocks 331.

Examples

FIG. 14 is a table showing results of performance testing of pneumatic tires according to embodiments of the present technology.

In the performance testing, a plurality of different test tires were evaluated for (1) snow performance and (2) wear resistance performance. The test tires with a tire size of 265/65R17 112H were mounted on a rim having a rim size of 17×8J, and an air pressure of 230 kPa and a maximum load as defined by JATMA were applied to the test tires. The test vehicle that the test tires were mounted on was a four wheel drive recreational vehicle (RV) with an engine displacement of 3500 cc.

(1) Evaluation of snow performance: The test vehicle was driven on a snowy road surface of a snowy road test site, and the braking distance from a traveling speed of 40 km/h was measured. Then, the measurement results were expressed as index values with the result of the conventional example being defined as the reference (100). In this evaluation, larger values are preferable.

(2) Evaluation of wear resistance performance: The test vehicle was driven on a paved road for 50000 km. Thereafter, the land portions were checked for uneven wear, and an estimated wear life was calculated. Results of the evaluation were expressed as index values with the result of the Conventional Example 1 being defined as the reference (100). In this evaluation, larger values are preferable.

The test tire of Example 1 had the configuration of FIGS. 1 to 3, except that the blocks 331 of the shoulder land portion 33 each included the main sipe 5 and the first lateral groove 332 but did not include the second lateral groove 333 and the auxiliary sipe 6. Additionally, the main sipe 5 had the structure with the two-dimensional sipe portion 51 and the three-dimensional sipe portion 52 connected in an L-shape (see FIG. 5). The main sipe 5 had the following dimensions for L2 and D2: L2=18.0 mm, D2=7.0 mm. The outermost circumferential main groove 22 had the following dimensions for the groove depth H0 and the groove width W0: H0=10.4 mm, W0=8.6 mm. The test tires of Examples 2 to 10 are modified examples of Example 1.

The test tire of Conventional Example 1 had the configuration of Example 1 except that the main sipe 5 was not provided and only the first lateral groove 332 was provided. The test tire of Conventional Example 2 had the configuration of Example 1, except that instead of the main sipe 5, a two-dimensional sipe with a straight shape extending in the tire lateral direction was disposed.

As shown in the test results, it can be seen that good snow performance and wear resistance performance can be achieved in a compatible manner in the test tires of Examples 1 to 10.

The invention claimed is:

1. A pneumatic tire, comprising:
a plurality of blocks arranged on a tire ground contact edge, each of the plurality of blocks comprising a first lateral groove extending in the tire lateral direction and opening to a laterally inner edge portion of the each of the plurality of blocks at one end portion and terminating within the each of the plurality of blocks at the other end portion;
the each of the plurality of blocks comprising an L-shaped sipe that comprises:
a two-dimensional sipe portion extending in a tire circumferential direction to the terminating end portion of the first lateral groove, and
a three-dimensional sipe portion extending in a tire lateral direction,
the two-dimensional sipe portion and the three-dimensional sipe portion connecting to each other or being disposed proximal to each other to form the L-shape.

2. The pneumatic tire according to claim 1, wherein the two-dimensional sipe portion and the three-dimensional sipe portion have a closed structure in which the two-dimensional sipe portion and the three-dimensional sipe portion terminate within the each of the plurality of blocks.

3. The pneumatic tire according to claim 1, wherein an angle $\theta$ formed by the two-dimensional sipe portion and the three-dimensional sipe portion is in the range: $-80$ degrees $\geq \theta \geq 100$ degrees.

4. The pneumatic tire according to claim 1, wherein a sipe length L1 of the two-dimensional sipe portion and a sipe length L2 of the three-dimensional sipe portion have the relationship: $0.2 \geq L1/L2 \geq 0.8$.

5. The pneumatic tire according to claim 1, wherein a sipe depth D1 of the two-dimensional sipe portion and a sipe depth D2 of the three-dimensional sipe portion have the relationship: $0.1 \geq D1/D2 \geq 0.6$.

6. The pneumatic tire according to claim 5, wherein the three-dimensional sipe portion comprises a raised bottom portion at a connection portion with the two-dimensional sipe portion.

7. The pneumatic tire according to claim 1, wherein an inclination angle $\alpha$ of the first lateral groove with respect to the two-dimensional sipe portion is in the range: $80$ degrees $\geq \alpha \geq 100$ degrees.

8. The pneumatic tire according to claim 1, wherein the each of the plurality of blocks comprises a second lateral groove extending in the tire lateral direction and terminating within a ground contact surface of the each of the plurality of blocks at one end portion and opening to the tire ground contact edge at the other end portion; and
the three-dimensional sipe portion extends to the terminating end portion of the second lateral groove.

9. The pneumatic tire according to claim 8, wherein a distance G2 between the three-dimensional sipe portion and the terminating end portion of the second lateral groove is in the range: $0.1$ mm $\geq G2 \geq 1.0$ mm.

10. The pneumatic tire according to claim 8, wherein an inclination angle $\theta$ of the second lateral groove with respect to the three-dimensional sipe portion is in the range: $0$ degrees $\geq \beta \geq 10$ degrees.

11. The pneumatic tire according to claim 1, wherein the each of the plurality of blocks comprises a first lateral groove extending from the two-dimensional sipe portion inward in the tire lateral direction and opening to a laterally inner edge portion of the each of the plurality of blocks, and a second lateral groove extending from the two-dimensional sipe portion outward in the tire lateral direction and opening to the tire ground contact edge; and
a groove depth H1 of the first lateral groove and a groove depth H2 of the second lateral groove have the relationship: $1.1 \geq H1/H2 \geq 2.5$.

12. The pneumatic tire according to claim 1, wherein the each of the plurality of blocks comprises a first lateral groove extending from the two-dimensional sipe portion inward in the tire lateral direction and opening to a laterally inner edge portion of the each of the plurality of blocks, and a second lateral groove extending from the two-dimensional sipe portion outward in the tire lateral direction and opening to the tire ground contact edge; and
a groove width W1 of the first lateral groove and a groove width W2 of the second lateral groove have the relationship: $1.1 \geq W1/W2 \geq 2.0$.

13. The pneumatic tire according to claim 1, further comprising an auxiliary sipe extending outward in the tire lateral direction from the two-dimensional sipe portion to the tire ground contact edge.

14. A pneumatic tire, comprising:
a plurality of blocks arranged on a tire ground contact edge, each of the plurality of blocks comprising a lateral groove extending in the tire lateral direction, the lateral groove terminating within a ground contact surface of the each of the plurality of blocks at one end portion and opening to the tire ground contact edge at the other end portion;
the each of the plurality of blocks comprising an L-shaped sipe that comprises:
a two-dimensional sipe portion extending in a tire circumferential direction, and
a three-dimensional sipe portion extending in a tire lateral direction to the terminating end portion of the lateral groove,
the two-dimensional sipe portion and the three-dimensional sipe portion connecting to each other or being disposed proximal to each other to form the L-shape.

15. A pneumatic tire, comprising:
a plurality of blocks arranged on a tire ground contact edge, each of the plurality of blocks comprising:
an L-shaped sipe that comprises:
a two-dimensional sipe portion extending in a tire circumferential direction, and
a three-dimensional sipe portion extending in a tire lateral direction,
the two-dimensional sipe portion and the three-dimensional sipe portion connecting to each other or being disposed proximal to each other to form the L-shape; and
a first lateral groove extending from the two-dimensional sipe portion inward in the tire lateral direction and opening to a laterally inner edge portion of the each of the plurality of blocks, and a second lateral groove extending from the two-dimensional sipe portion outward in the tire lateral direction and opening to the tire ground contact edge;

wherein a groove width W1 of the first lateral groove and a groove width W2 of the second lateral groove have the relationship: $1.1 \geq W1/W2 \geq 2.0$.

* * * * *